Aug. 1, 1950  B. N. ASHTON  2,517,377
POWER PACK UNIT

Filed March 14, 1947  4 Sheets-Sheet 1

INVENTOR
BENJAMIN N. ASHTON
BY
Campbell, Brumbaugh + Free
HIS ATTORNEYS

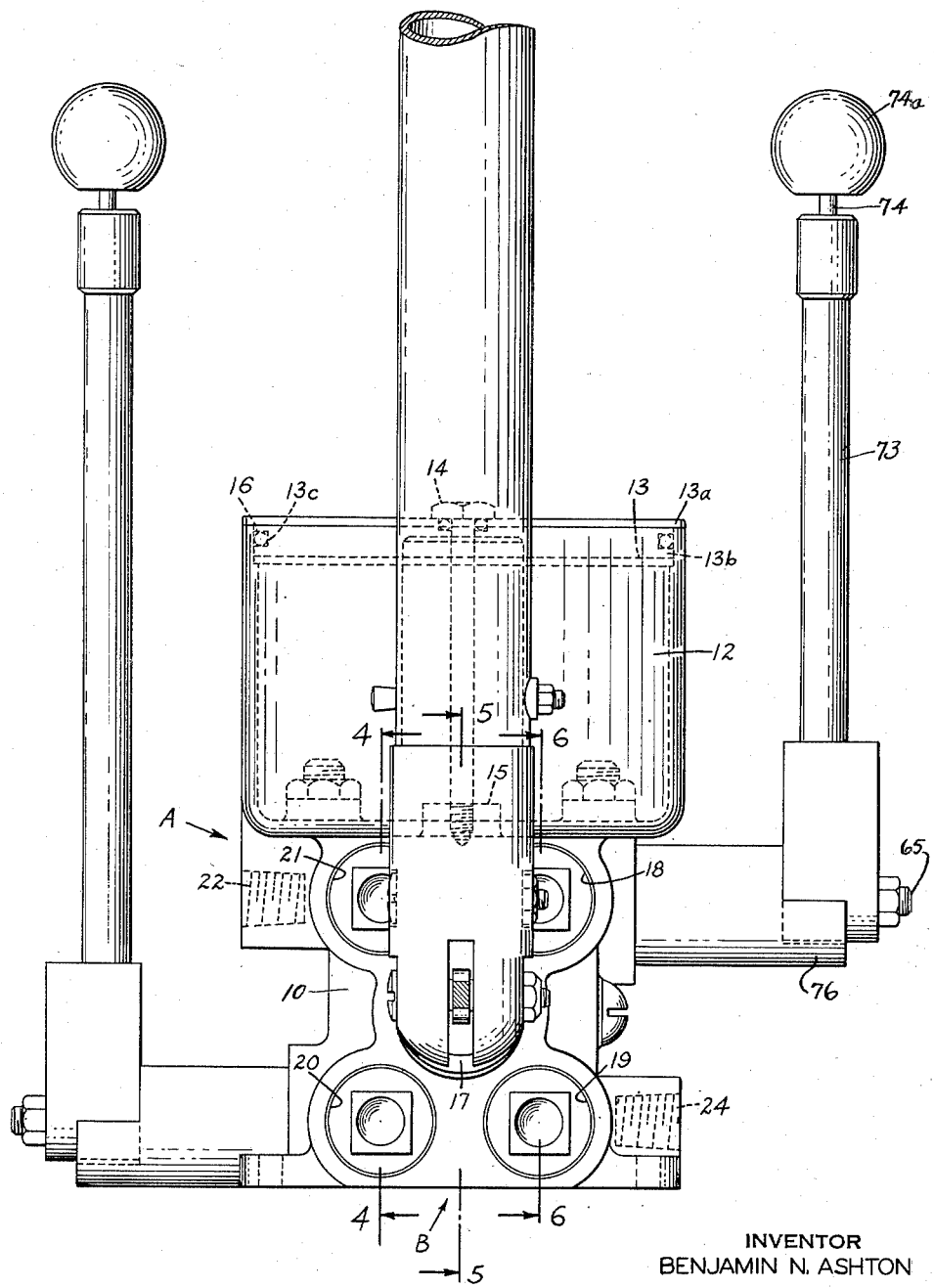

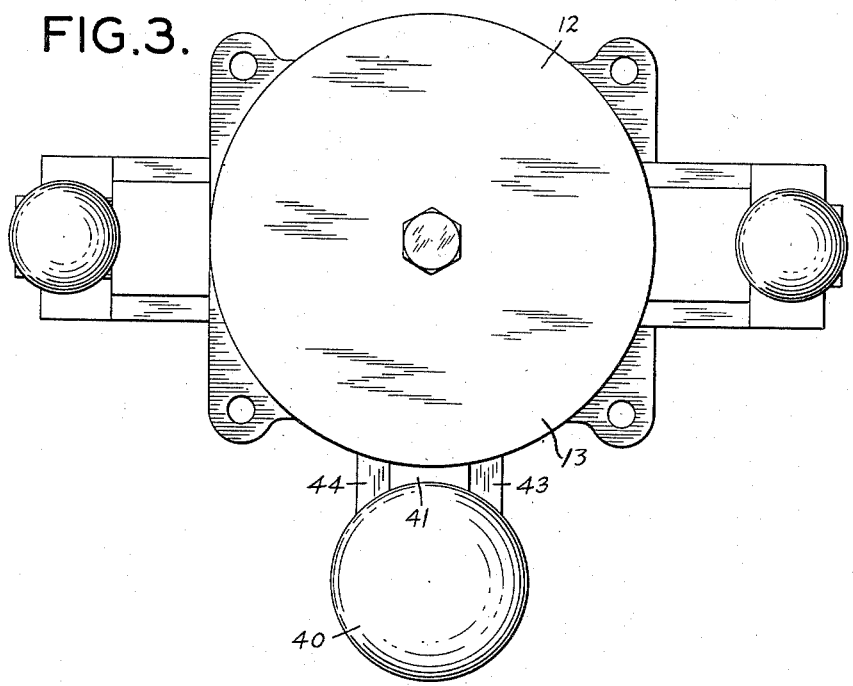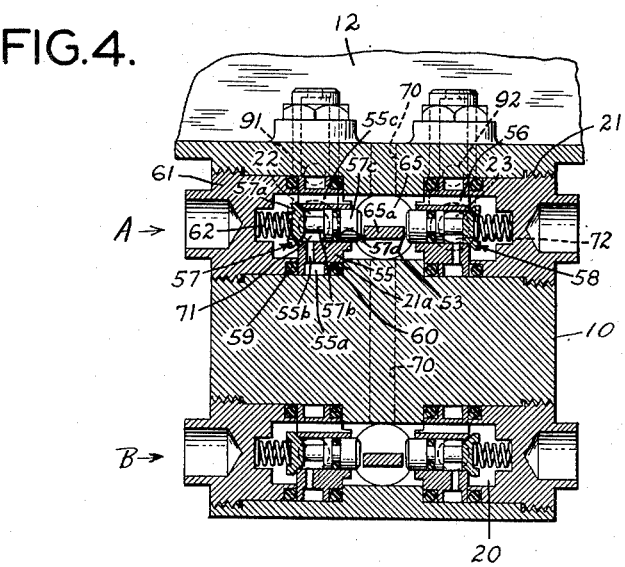

Aug. 1, 1950  B. N. ASHTON  2,517,377
POWER PACK UNIT

Filed March 14, 1947  4 Sheets-Sheet 4

INVENTOR
BENJAMIN N. ASHTON
BY
HIS ATTORNEYS

Patented Aug. 1, 1950

2,517,377

UNITED STATES PATENT OFFICE 2,517,377

POWER PACK UNIT

Benjamin N. Ashton, Kingston, N. Y., assignor to Electrol Incorporated, Kingston, N. Y., a corporation of Delaware Application March 14, 1947, Serial No. 734,713

4 Claims. (Cl. 103—41)

This invention relates to hydraulic power pack units and it relates particularly to an improved form of power pack unit including a pump for supplying fluid under pressure and selector valves by means of which the operation of elements at a remote point or points can be controlled. The device embodying the invention is particularly useful for the retraction and projection of landing gear and wing flaps of aircraft although it may be used for other purposes wherein compact units requiring hydraulic power or pressure are required.

A typical form of power unit embodying the present invention may include a casing member having a reservoir for receiving hydraulic fluid, the casing being provided with one or more sets of selector valves by means of which a liquid may be supplied to elements at remote points such as, for example, hydraulic jacks for actuating the landing gear and the wing flaps of aircraft. The device is further provided with a manually operated piston type pump in the center of the casing which may be actuated by a suitable pump handle to withdraw liquid from the reservoir and supply it under pressure to the selector valve or valves.

The arrangement of the valves and the pump in the single casing together with a supply reservoir provides a compact assembly and also allows a greatly simplified mounting for the entire assembly.

Usually, heretofore, the selector valves and the pump have been separate units and have been connected by conduits and other connections to the elements to be operated. Inasmuch as they have not been a unitary assembly, considerable difficulty has been encountered in properly servicing, removing and replacing the various elements.

The power pack of the present invention overcomes these difficulties and allows the easy servicing and replacement of the unit should it be damaged and also greatly simplifies the connections between the unit and the elements to be operated thereby.

For a better understanding of the present invention, reference may be had to the accompanying drawings in which Figure 1 is a view in side elevation of a typical form of power pack unit embodying the invention;

Figure 2 is an end view of a power pack unit;

Figure 3 is a top plan view of the power pack unit;

Figure 4 is a view in section taken on line 4—4 of Figure 2;

Figure 1:
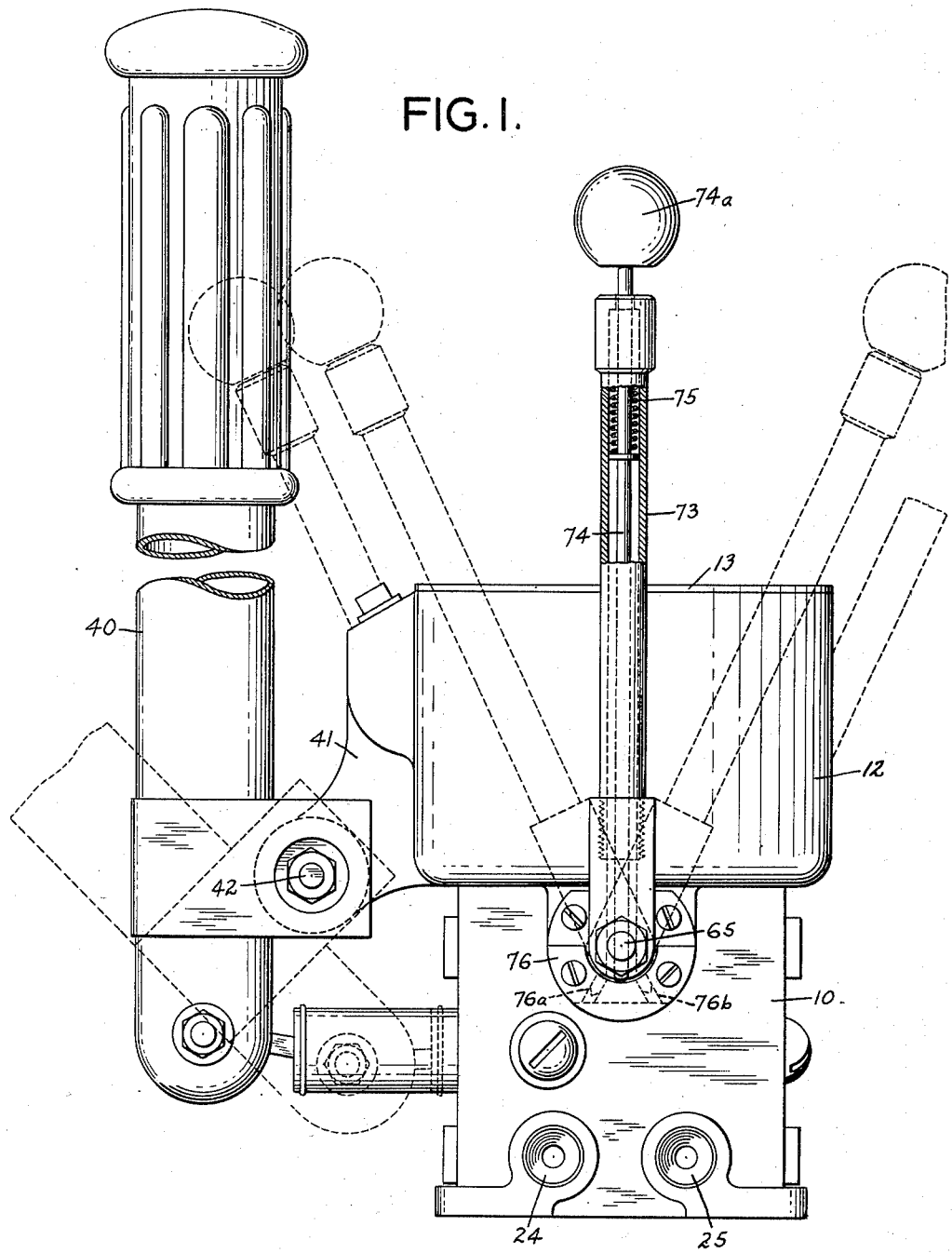

The form of the invention chosen for purposes of illustration may include the casing 10 and a reservoir 12 which may be formed as a unitary casing of a lightweight material such as, for example, aluminum, magnesium, their alloys or plastic. The reservoir 12 is supported on top of the casing portion 10 and may be integral therewith. The reservoir is generally cup-shaped or circular in plan and has sufficient capacity to receive the liquid necessary to operate such remote controlled devices as the flaps and landing gear. The reservoir 12 is provided with a cover 13 of disklike form which has an upper flange 13a thereon, overlying the upper edge of the reservoir 12 and a reduced portion 13b which fits within the upper edge of the reservoir 12. The lid 13 may be retained in position by means of a bolt 14 extending through the cover and threaded into a boss 15 in the bottom of the reservoir. In order to provide a leakproof seal, the lid may be provided with a groove 13c in which is mounted a rubbery sealing ring 16.

The casing portion 10 may take the form of a generally rectangular block of metal and it is provided with a central bore 17 and four other bores, 18, 19, 20 and 21 arranged symmetrically about the central bore 17. In order to reduce the weight of the assembly, the blocklike casing 10 may be formed to conform closely to the shape of the bores 17 to 20 and also is formed with couplings 22 and 23 forming an outlet and return port for the upper selector valve unit assembled in the bores 18 and 21 and couplings 24 and 25 forming the outlet and return ports for the selector valve unit assembled in the bores 19 and 20.

Figure 5:
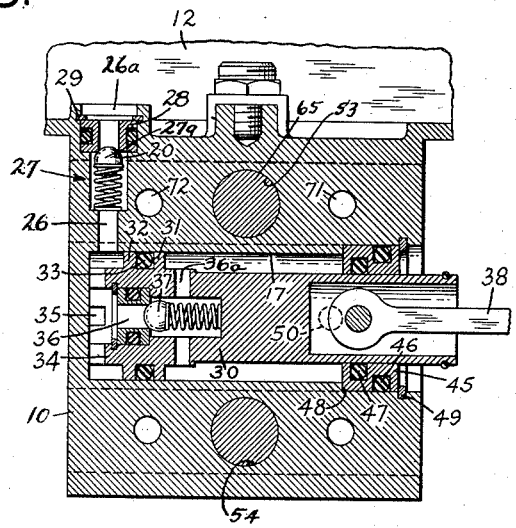
Figure 5 is a view in section taken on line 5—5 of Figure 2.

The pump mechanism is best shown in Figure 5.

The bore 17 forms the cylinder of the pump. It communicates with a vertical passage 26 which in turn communicates with the bottom of the reservoir 12 and is provided with a check valve element 27 so that liquid can flow only from the reservoir 12 into the passage 18. The check valve 27 may include a spring-urged ball 27a which bears against the under side of a seat ring 28 mounted in an enlarged portion 26a of the passage 18 and retained therein by means of a snap ring 29.

The piston of the pump consists of an elongated member 30 having flanges 31 and 32 adjacent one end forming a groove for receiving a rubbery piston ring 33 of circular cross-section. The left-hand end of the piston 30 is provided with a rim portion 34 having a plurality of notches 35 therein through which liquid can enter the centrally located passage 36 and pass by the ball-type check valve 37 which is mounted in the passage 36. A cross passage 36a extends through the piston to permit liquid to flow by the check valve 37 into the cylinder 17 around the piston member 30. The right-hand end of the piston is provided with a bore for receiving the link 38 which connects the piston to the pump handle 40. The handle is mounted on a lug 41 (Figure 1) projecting from one side of the reservoir 12 and is supported by means of a pivot pin 42 passing through spaced arms 43 and 44 on the handle so that the handle 40 may be rocked back and forth. The piston 30 is further guided in the bore by means of a sealing ring 45 which is provided with outer and inner grooves for receiving the rubbery ring seals 46 and 47. The ring 45 bears against a shoulder 48 in the bore and is retained against the shoulder by means of a snap ring 49.

Figure 6:
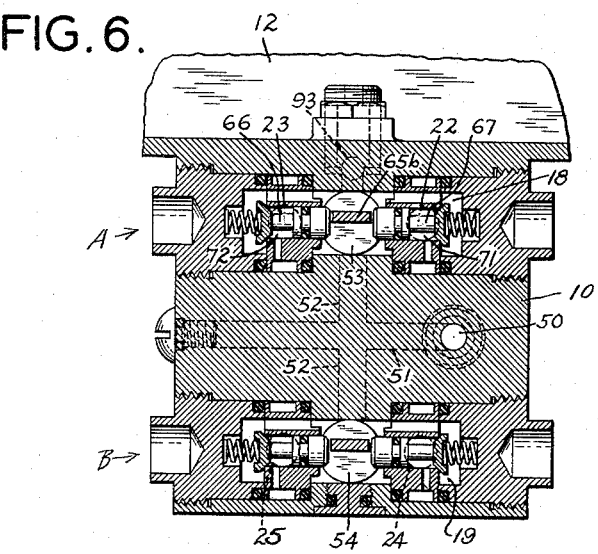
Figure 6 is a view in section taken on line 6—6 of Figure 2.

Liquid is discharged from the cylinder 17 through the discharge port 50 which is best shown in Figures 5 and 6. The passage 50 may be produced by drilling the casing in the direction perpendicular to the bore 17. Another passage 51 communicates with the passage 50 and this latter passage 51 is intersected by still another passage 52 which is in communication with the bores 18 and 19 where they intersect the bores 53 and 54 which receive the cam shafts for actuating the selector valves, later to be described. The pump operates by reciprocating the entire piston 30 by means of handle 40. As the piston reciprocates, liquid is drawn through the check valve 27 into the cylinder 17 as the piston moves toward the right as viewed in Figure 5. Upon the return stroke of the piston 30, the check valve 27 closes and the check valve including the ball 37 opens so that liquid is forced through the passages 36 and 36a and out through the passages 50, 51, 52 and into the bores 53 and 54 and the bores 18 and 19 (Figure 6).

The selector valves described hereinafter may be generally of the type disclosed in the Ashton Patent No. 2,349,069 dated May 16, 1944. Each selector valve unit of the present invention is a four-port valve having four valve plugs and seats therein for controlling the flow of liquid from the pump to the remote-controlled element and for returning the liquid to the reservoir. The two selector valve units A and B disclosed herein are substantially identical and only one valve unit will be described in detail. Referring now to Figure 4, the selector valve elements mounted in bore 21 include a pair of collar members or sleeves 55 and 56 forming valve seats which are adapted to receive slidably the poppet valves 57 and 58 which are identical. The poppet valve 57 has a cone-shaped head 57a, a reduced valve stem portion 57b and an enlarged plug portion 57c provided with a groove for receiving a sealing ring 57d which prevents leakage between the sleeve 55 and the plug 57. The exterior of the sleeve 55 is provided with a circumferential groove 55a which communicates with the interior of the sleeve through a radial port 55b so that when the cone valve 57a is unseated, liquid can flow past the cone head 57a into the sleeve around the valve stem 57b and out through the port 55b to the circumferential groove 55a. Leakage of fluid into and out of the groove 55a is prevented by means of ring seals 59 and 60 encircling the sleeve 55 on opposite sides of the groove. The sleeve 55 is positioned in the bore by engagement with an internal shoulder 21a in the bore and by means of a recessed plug 61 threaded into the outer end of the bore. A spring 62 is interposed between the plug and the valve head 57a to normally urge the poppet against the edge of the sleeve 55 which forms the valve seat.

In order to conduct the liquid to the passage 53 from the valve member 57a, a passage 55c is provided in sleeve 55. The opposite valve member comprising the sleeve 56 and the valve plug 58 is identical to that described above and is placed in opposition to the other valve.

Both of the valve elements 57 and 58 in the bore 21 are actuated by the cam member 65 which is generally of cylindrical shape except at the zone between the inner ends of the valves 57 and 58 where it has a rectangular cross-section 65a eccentric to the axis of the shaft.

The cam shaft 65 also actuates two other valves 66 and 67 located in the bore 18. Valves 66 and 67 are actuated by means of a rectangular cam member 65b which is set diametrically opposite to the cam member 65a so that diagonally opposite valves are actuated upon rocking of the cam shaft. The two bores 18 and 21 are out of communication with each other so that inlet and return flow of liquid can be controlled by these valves.

The bore 70 connects the mid-point of the passages 20 and 21 to the reservoir 12 to return liquid to the reservoir, as shown in Figure 4.

As shown in Figures 4, 5 and 6, the inlet and outlet ports 22 and 23 are connected to the valves so that liquid can be discharged selectively and returned from a remotely controlled apparatus. Thus the port 22 is connected by means of a passageway 71 to the space or groove 55b in the sleeve 55 and also to the corresponding groove in the sleeve of the valve 67. Similarly, the port 23 is connected to the groove in the sleeve 56 and the corresponding groove in the sleeve of the valve 23 by means of the transverse passage 72.

The cam shaft 65 is provided with a handle 73 at its outer end so that the shaft may be rocked to actuate the valves. The handle 73 is hollow and has a plunger 74 therein provided with a knob 74a. The plunger is urged inwardly by means of a spring 75 to engage an arcuate flange 76 concentric with the shaft 65 and secured to the casing 10. The flange 76 has internal recesses 76 and 76b for receiving the plunger 74 to retain it in either of the dotted line positions shown on Figure 1.

When the actuating handle 73 is rocked in a direction to unseat the valve plug 58, the cam element 65b simultaneously unseats the valve plug of the valve 67. When the pump is actuated, fluid under pressure is delivered by the passage 52 to the valve 67, and it will flow past the open valve 67 and outwardly through the passage 71 to the port 22. At the same time, if the device being actuated is a wing flap cylinder, the liquid will be returned through the port 23, the passage 72, the open valve 58 into the bore 21 and to the reservoir through the return passage 70. If the control lever 73 is then rocked in the opposite direction, the opposite valves will be actuated so that liquid under pressure will pass through the valve 66 and outwardly through the port 23 and the return liquid will flow past the valve plug 57 through the passage 71 to the return port 70 into the reservoir. The other selector valve mechanism B is exactly the same with the selector valve elements being assembled in the bores 19 and 20 and communicating in the same way with the couplings 24 and 25.

The above-described power pack unit permits two different mechanisms to be actuated by hydraulic pressure by connecting them to the selector valve units A and B. In order to compensate for variations in fluid pressure resulting from temperature changes, the device may be provided with temperature relief valves 91 and 92 between the passages 71 and 72 and the reservoir 12 so that upon expansion of liquid in the system the excess liquid may escape past the ball check valves and into the reservoir. Also, in order to prevent the pump from producing too high a pressure in the system a pressure relief valve 93 of the ball type is located in the passageway 52 between the reservoir 12 and the bore 18 so that excessive pressure will cause the liquid to discharge from the pump cylinder 17 into the reservoir.

From the preceding description of a typical form of power pack unit embodying the present invention, it will be clear that I have provided simple and compact devices which may be used in airplanes or other devices for controlling the operation of any hydraulically powered apparatus. Thus, the entire device may be mounted conveniently on the floor of the cockpit or on the instrument panel or in any other convenient position.

It will be understood that the invention is susceptible to considerable modification and that the type of selector valves and pump used therein may be varied as desired. Therefore, the form of the invention described above should be considered as illustrative and not as limiting the scope of the following claims.

I claim:

1. A hydraulic power pack unit comprising a casing having a substantially centrally located bore forming a pump cylinder, two pairs of bores located substantially symmetrically with respect to, and substantially parallel with, said cylinder, a hollow closed receptacle for hydraulic fluid mounted on the top of said casing, a piston reciprocable in said cylinder, a piston-actuating lever pivotally connected to said casing and to said piston, a first passage in said casing connecting said receptacle to said pump cylinder, a second passage in said casing connecting said cylinder to said pairs of bores, check valves interposed between said receptacle and said second passage, whereby reciprocation of said piston withdraws fluid from said receptacle and forces it into said bores, a pair of poppet valves in each of said bores, a first pair of ports in said casing communicating with one of said pairs of bores, a first cam means rotatably mounted in said casing for actuating the valves in one of said pairs of bores to direct fluid from said cylinder to one of said ports and return fluid to the receptacle from the other port, a second pair of ports communicating with the other pair of bores, and second cam means cooperating with the valves in said other pair of bores for actuating the valves therein to deliver fluid from the pump cylinder to one of the communicating pair of ports and return fluid from the other communicating ports to said receptacle.

2. A hydraulic power pack unit comprising a casing having a substantially centrally located bore forming a pump cylinder, two pairs of bores substantially parallel with said pump cylinder located substantially symmetrically with respect to said cylinder, a hollow closed receptacle for hydraulic fluid mounted on the top of said casing, a piston reciprocable in said cylinder, a piston-actuating lever pivotally connected to said casing and to said piston, a first passage in said casing connecting said receptacle to said pump cylinder, a second passage in said casing connecting said cylinder to said pairs of bores on the opposite side of said piston from said first passage, a check valve in said first passage permitting flow of fluid from said receptacle to said cylinder, an opening through said piston, a second check valve in said opening permitting flow of fluid through said piston to said second passage, whereby reciprocation of said piston withdraws fluid from said receptacle and forces it into said bores, a pair of poppet valves in each of said bores, a first pair of ports in said casing communicating with one of said pairs of bores, a first cam means rotatably mounted in said casing for actuating the valves in one of said pairs of bores to direct fluid from said cylinder to one of said ports, and return fluid to the receptacle from the other port, a second pair of ports communicating with the other pair of bores, and second cam means cooperating with the valves in said other pair of bores for actuating the valves therein to deliver fluid from the pump cylinder to one of the communicating pair of ports and return fluid from the other communicating ports to said receptacle.

3. A hydraulic power pack unit comprising a casing having a substantially centrally located bore forming a pump cylinder, a pair of bores substantially parallel with said pump cylinder, a hollow closed receptacle for hydraulic fluid mounted on the top of said casing, a piston reciprocable in said cylinder, a piston-actuating lever pivotally connected to said casing and to said piston, a first passage in said casing connecting said receptacle to said pump cylinder, a second passage in said casing connecting said cylinder to said pair of bores, check valves interposed between said receptacle and said second passage, whereby reciprocation of said piston withdraws fluid from said receptacle and forces it into said bores, a pair of poppet valves in each of said bores, a pair of ports in said casing communicating with said pair of bores, and cam means rotatably mounted in said casing for actuating the valves in said bores to direct fluid from said cylinder to one of said ports and return fluid to the receptacle from the other port.

4. A hydraulic power pack unit comprising a casing having a substantially centrally located bore forming a pump cylinder, a pair of bores in said casing substantially parallel with said pump cylinder, a hollow closed receptacle for hydraulic fluid mounted on the top of said casing, a piston reciprocable in said cylinder, a piston-actuating lever pivotally connected to said casing and to said piston, a first passage in said casing connecting said receptacle to said pump cylinder, a second passage in said casing connecting said cylinder to said pair of bores, check valves interposed between said receptacle and said second passage, whereby reciprocation of said piston withdraws fluid from said receptacle and forces it into said bores, a pair of poppet valves in each of said bores, a pair of ports in said casing communicating with said pair of bores, an opening in a side of said casing intersecting said pair of bores, and cam means rotatably mounted in said opening for actuating the valves in said bores to direct fluid from said cylinder to one of said ports and return fluid to the receptacle from the other port.

BENJAMIN N. ASHTON.

REFERENCES CITED

The following references are of record in the file of this patent:

UNITED STATES PATENTS

| Number | Name | Date |
|---|---|---|
| 2,037,434 | Pfauser | Apr. 14, 1936 |
| 2,057,934 | Brown | Oct. 20, 1936 |
| 2,187,036 | Kerber | Jan. 16, 1940 |
| 2,243,648 | Patton et al. | May 27, 1941 |
| 2,348,412 | Pfauser | May 9, 1944 |
| 2,349,069 | Ashton | May 16, 1944 |